(12) United States Patent
Basu et al.

(10) Patent No.: US 7,180,864 B2
(45) Date of Patent: Feb. 20, 2007

(54) METHOD AND APPARATUS FOR EXCHANGING ROUTING INFORMATION WITHIN AN AUTONOMOUS SYSTEM IN A PACKET-BASED DATA NETWORK

(75) Inventors: Anindya Basu, Jersey City, NJ (US);
Chih-Hao Luke Ong, Oxford (GB);
April Patricia Rasala, Newton, MA (US); Frederick Bruce Sheperd, Summit, NJ (US); Gordon Thomas Wilfong, Gillette, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 937 days.

(21) Appl. No.: 10/085,568

(22) Filed: Feb. 27, 2002

(65) Prior Publication Data

US 2003/0174653 A1 Sep. 18, 2003

(51) Int. Cl.
*H04L 12/26* (2006.01)
(52) U.S. Cl. ............... 370/238; 370/252; 370/254
(58) Field of Classification Search ............ None
See application file for complete search history.

(56) References Cited

U.S. PATENT DOCUMENTS

| | | | | |
|---|---|---|---|---|
| 6,130,890 | A * | 10/2000 | Leinwand et al. | 370/400 |
| 6,981,055 | B1 * | 12/2005 | Ahuja et al. | 709/238 |
| 2002/0049762 | A1 * | 4/2002 | Shah et al. | 707/10 |
| 2002/0051449 | A1 * | 5/2002 | Iwata | 370/389 |
| 2003/0012145 | A1 * | 1/2003 | Bragg | 370/254 |
| 2003/0072270 | A1 * | 4/2003 | Guerin et al. | 370/254 |

OTHER PUBLICATIONS

U.S. Appl. No. 09/583,595, filed May 31, 2000, Griffin et al.
A. Retana, Cisco Systems, Inc., Unsolicited e-mail including unpublished draft titled "BGP Path-Type Attribute," received Mar. 2001.
T. Bates and R. Chandra: "BGP Route Reflection: An Alternative to Full Mesh I-BGP", Network Working Group RFC 1966, Jun. 1996.
R. Dube and J. G. Scudder, "Route Reflection Considered Harmful" Internet Draft "draft-dube-route-reflection-harmful-00.txt.", Nov. 1998.
L. Gao, et al., "Inherently Safe Backup Routing With BGP", Proceedings of Infocom '01, Anchorage, Alaska, Apr. 2001.

(Continued)

*Primary Examiner*—Huy D. Vu
*Assistant Examiner*—Toan Nguyen
(74) *Attorney, Agent, or Firm*—Kenneth M. Brown

(57) ABSTRACT

A method for exchanging routing information between I-BGP routers within an autonomous system (AS) advantageously enables a solution to both persistent route oscillation problems and transient route oscillation problems which may occur when using I-BGP in a given AS. Conventional I-BGP protocol techniques are extended by enabling I-BGP speakers (e.g., routers) to communicate a set of possible best paths to a given destination, rather than communicating only a single best path, to each of their I-BGP peers within the given AS. Specifically, a plurality of possible best paths to a destination are communicated (where there are in fact more than one) from an I-BGP speaker in a given AS to its I-BGP peers (within the given AS), for each neighboring AS that provides any such paths (i.e., routes to the destination).

14 Claims, 5 Drawing Sheets

OTHER PUBLICATIONS

R. Govindan et al., "An Architecture for Stable, Analyzable Internet Routing", IEEE Network, 13(1):29-35, Jan.-Feb. 1999.

T. G. Griffin, et al., "Policy Disputes in Path Vector Protocols", Proceedings of the 7th International Conference on Network Protocols (ICNP '99), Toronto, Canada, Nov.-Dec. 1999.

T. G. Griffin, et al., "An Analysis of BGP Convergence Properties", Proceedings of SIGCOMM '99, Cambridge, Mass., Aug.-Sep. 1999.

T. G. Griffin, et al., "A Safe Path Vector Protocol", Proceedings of Infocom '00, Tel Aviv, Israel, Mar. 2000.

C. Labovitz, et al., "The Impact of Internet Policy and Topology on Delayed Routing Convergence", Proceedings of Infocom '01, Anchorage, Alaska, Apr. 2001.

C. Labovitz, et al., "Internet Routing Instability", Proceedings of SIGCOMM '97, Cannes, France, Sep. 1997.

C. Labovitz, et al., "Origins of Internet Routing Instability", Proceedings of Infocom '99, New York, New York, Mar. 1999.

D. McPherson, et al., "BGP Persistent Route Oscillation Condition", Internet Engineering Task Force, Internet Draft "draft-ietf-idr-route-oscillation-00.txt", Dec. 2000.

Y. Rehkter, et al., "A Border Gateway Protocol (BGP version 4)", Network WorkingGroup RFC 1771, Mar. 1995.

Cisco Systems, "Endless BGP Convergence Problem in Cisco IOS Software Releases", Cisco Systems Inc. Field Notice, Oct. 10, 2000.

P. Traina, "Autonomous System Confederations for BGP", Network Working Group RFC 1965, Jun. 1996.

K. Varadhan, et al., "Persistent Route Oscillations in Inter-Domain Routing", Technical Report 96-631, USC/ISI, Mar. 1996.

* cited by examiner

METHOD AND APPARATUS FOR EXCHANGING ROUTING INFORMATION WITHIN AN AUTONOMOUS SYSTEM IN A PACKET-BASED DATA NETWORK

FIELD OF THE INVENTION

The present invention relates generally to packet-based data networks and in particular to a method and apparatus for the exchange of routing information between routers within an autonomous system contained in such a network.

BACKGROUND OF THE INVENTION

In packet-based data networks such as the Internet, routers "talk" to each other to exchange routing information. Specifically, a router will announce the path it will use to get to a particular destination to each of its peer routers. Each router will thus know the path that its peer routers will take in sending a packet to a particular destination. Routing protocols, running on the routers, are used to exchange such information between routers. A routing protocol can be an Internal Gateway Protocol (IGP) or an Exterior Gateway Protocol (EGP).

An IGP is used for routing within an administrative domain such as within a corporate backbone network or within a network that is owned by one company and has a unified administrative control over how routing is done. Such a domain is referred to as an autonomous system (or "AS"). Generally such IGP routing is metric-based in that the goal in routing between two points within an administrative domain is to find the route with the lowest cost, where cost may, for example, be distance or some other parameter that can be assigned to a link between routers. Examples of common IGP routing protocols are the Routing Information Protocol (RIP), the Open Shortest Path First (OSPF) protocol, and the Intermediate System to Intermediate System (IS—IS) protocol. The advantageous property of such IGPs is that they are guaranteed to always achieve a stable routing within the network that is consistent with the network's configuration. The difference between the different routing protocols lies in the nature of the messages passed between routers. Since an IGP is used within a network that is owned or controlled by a single organization, no hostility exists between the owners of the routers within the network that might otherwise affect the willingness of one particular router to accept traffic from another.

An EGP is used to exchange routing information between autonomous systems. Thus, border, or edge, routers that might link, for example, an autonomous AT&T network with an autonomous Sprint network, need to communicate via an EGP rather than an IGP. Unlike a single autonomous system in which routing can be metric based, routing between autonomous systems needs to be policy based. Each autonomous system may in fact want to protect itself from being used by others who are not paying for its use. Thus, one autonomous system may restrict routing through it from a competitor's system since it doesn't want such competitor's customers to use its resources, even though such routing would be the "shortest" path. EGPs, unlike metric-based IGPs, are thus policy based because autonomous systems will not always be able to agree as to the best path to a specified destination. As a result, an EGP is much more complicated to administer since it involves expressing a policy of how an administrative domain wants to interact with the rest of the world.

The Border Gateway Protocol (BGP) is currently the only EGP employed on the Internet (see, e.g., Y. Rekhter and T. Li, "A border gateway protocol", RFC 1771 [BGP version 4], 1995; J. W. Stewart, BGP4, *Inter-Domain Routing in the Internet*, Addison-Wesley, 1998; and B. Halabi, *Internet Routing Architectures*, Cisco Press, 1997). The BGP, which has become a de-facto standard, allows each autonomous system to independently formulate its own routing policies, and it allows these policies to override distance metrics in favor of policy concerns. However, routing policies of autonomous systems can conflict with each other. Inconsistencies in routing policies can result in several problems such as the inability to find a stable routing plan. Thus, as a change at one router occurs, information is exchanged with its peers that causes a second router to change its routing and exchange information with its peer routers, etc., etc., eventually causing the first router to change its routing again, then the second and so forth. In such a case, the protocol is said to diverge and cause a route oscillation. Thus, with the BGP, edge routers between autonomous systems could continue to only exchange information without ever agreeing upon a stable routing plan. Such a situation could in fact have a catastrophic effect in the global Internet resulting in improperly routed traffic, and possibly even causing "gridlock" on the Internet with the amount of routing information being transferred from router to router. The latter could slow the network down to a crawl and, in a worst case situation, could cause a "meltdown" of the Internet. Further, an autonomous system on the network has no ability to determine the cause of the routing problems since it only has local information available to it. Even if it had such an ability, no one autonomous system would have the ability to correct oscillations caused by inconsistency of routing policies between autonomous systems.

The BGP can in fact be conceptually separated into two distinct protocols—External BGP (or E-BGP), which is the protocol used for exchanging external routing information among different autonomous systems, and Internal BGP (or I-BGP), which is the protocol used for exchanging this external routing information among routers within the same AS. (Although the RFC which defines the BGP does not explicitly refer to the external and internal versions of BGP as E-BGP and I-BGP, respectively, this terminology is in common usage by those of ordinary skill in the art when referring to the two uses of BGP.)

In U.S. patent application Ser. No. 09/583,595, "Method and Apparatus for Exchanging Routing Information in a Packet-Based Data Network", filed by T. G. Griffin and G. T. Wilfong on May 31, 2000, a novel routing protocol, referred to as the Simple Path Vector Protocol (SPVP), is disclosed. SPVP extends the E-BGP by adding a new attribute to the routing messages sent by an edge router to its peers in different autonomous systems. This additional attribute is a path history which is dynamically computed at each edge router as the routing path to a particular destination is changed, and which is then sent by the router to its peers together with the sending router's path to that destination. Noting that protocol oscillations caused by policy conflicts produce paths whose histories contain cycles, by observing the dynamic path history that is computed at an edge router as a received routing message from a peer router that contains a history attribute is processed, a cycle can be identified in the newly computed history and associated with a policy conflict at that receiving edge router's associated autonomous system. Thus, SPVP can automatically and advantageously suppress as a permitted path to that destination those paths whose histories contain cycles, thereby solving the route oscillation problem in E-BGP. U.S. patent application Ser. No. 09/583,595, which is commonly assigned to the assignee of the present invention, is hereby incorporated by reference as if fully set forth herein.

It has also been observed, however, that route oscillations can occur when using I-BGP as well, particularly when "route reflection" or "confederation" I-BGP architectures are employed within an AS. (See, e.g., Cisco Systems, Endless BGP Convergence Problem in Cisco IOS Software Releases, Cisco Systems Inc. Field Notice, Oct. 10, 2000.) (Route reflection I-BGP architectures and confederation I-BGP architectures are alternatives to a full mesh I-BGP architecture, in which every I-BGP router shares routing information with every other I-BGP router in a given AS. These architectures are conventional and fully familiar to those skilled in the art—see, e.g., T. Bates and R. Chandra, BGP Route Reflection: An Alternative to Full Mesh I-BGP, RFC 1966, 1996.) That is, some subset of the routers within an AS may exchange routing information forever without being able to settle on a stable routing configuration. This happens when no stable routing configuration exists (or when such a stable configuration is unachievable). Such a route oscillation is referred to as a persistent route oscillation.

Moreover, another kind of route oscillation—transient route oscillation—can also occur in such a system. In this case, some subset of routers may undergo route oscillations due to a timing coincidence, such as, for example, message delays or a particular order in which the routers send and receive messages. These route oscillations are transient in nature because they will typically disappear when the timing coincidence no longer exists. Nonetheless, they can result in significant Internet performance bottlenecks until the time that they do resolve.

SUMMARY OF THE INVENTION

In accordance with the present invention, a novel method and apparatus for exchanging routing information between I-BGP routers within an autonomous system (AS) advantageously enables a solution to both persistent route oscillation problems and transient route oscillation problems which may occur when using I-BGP in a given AS. In particular, conventional I-BGP protocol techniques are advantageously extended by enabling I-BGP speakers (e.g., routers) to communicate a set of possible paths (i.e., routes) to a given destination, rather than communicating only a single best path, to each of their I-BGP peers within the given AS. More particularly, and in accordance with the principles of the present invention, a plurality of paths to a destination are communicated (where there are in fact more than one) from an I-BGP speaker in a given AS to its I-BGP peers (within the given AS), for each "neighboring" AS that provides any such paths (i.e., routes to the destination). (A "neighboring" AS is defined herein as an AS which contains a "next hop" router for a given path, where—as is well known to those skilled in the art—the "next hop" router of a path from a given AS to a destination is the first router on the path which is not part of the given AS. Also, note that a "next hop" AS of a path is defined herein as the AS which includes the "next hop" router of the path. And finally, note that the terms "route" and "path" are used interchangeably herein.)

Specifically, in accordance with the present invention, a method and apparatus for communicating routes in a packet-based network is provided. The method, which is for use at a first router comprised in a first autonomous system, and the apparatus, which is a first router comprised in a first autonomous system, each comprise steps or means, respectively, for receiving a first routing message from a peer router of said first router, the first routing message comprising a first path from the first autonomous system to a destination, the first path from the first autonomous system to the destination including a second autonomous system, the second autonomous system being a next hop of said first path; receiving a second routing message from a peer router of said first router, the second routing message comprising a second path from the first autonomous system to the destination, the second path from the first autonomous system to the destination being different from the first path from the first autonomous system to the destination, the second autonomous system also being a next hop of said second path; and sending a third routing message to one or more peer routers of said first router, said one or more peer routers comprised in said first autonomous system, the third routing message comprising both the first path from the first autonomous system to the destination and the second path from the first autonomous system to the destination.

DETAILED DESCRIPTION

Figure 1:
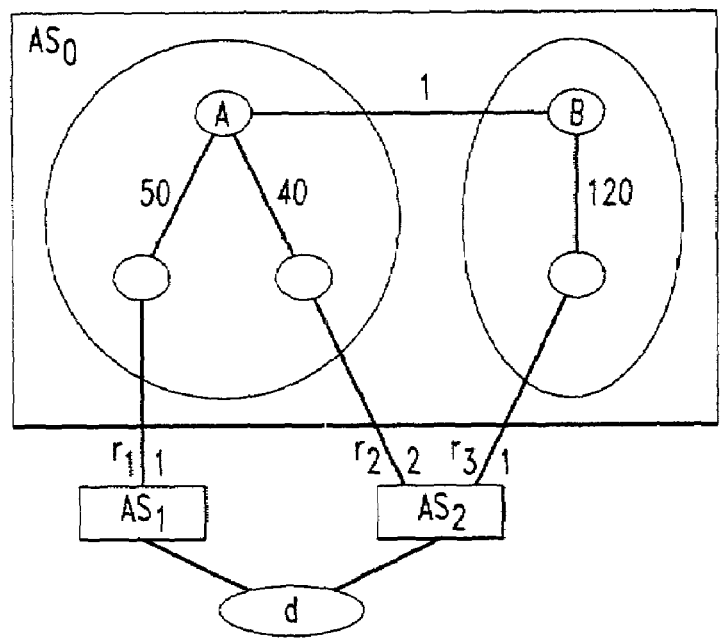
FIG. 1 shows a portion of a packet-based network configuration for which persistent route oscillations can occur.

Overview of I-BGP, Route Reflection, and the I-BGP Route Selection Process

The purpose of I-BGP is to internally distribute "externally learned" routes within the routers of a given autonomous system (AS). The use of I-BGP ensures that all routers used within an AS implement a consistent routing policy. A crucial difference between I-BGP and E-BGP is that they use separate mechanisms to prevent looping in the routing announcements. In E-BGP, routers look at the AS-PATH attribute that contains a list of ASs that the routing announcement has passed through. If an AS occurs more than once in the list, a loop has occurred in the routing announcement. Since all participants in I-BGP belong to the same AS, this technique of using the AS-PATH attribute to detect loops cannot be used. If a full mesh of connections is maintained among all I-BGP speakers in the same AS (i.e., a full mesh I-BGP architecture), however, no I-BGP speaker needs to forward routes that it receives from an I-BGP peer.

But maintaining a full mesh of connections has scaling problems since it requires the number of I-BGP peering sessions to be quadratic in the number of I-BGP speakers (e.g., I-BGP routers). One approach to alleviate this problem is called route reflection, an alternative I-BGP router architecture which is fully familiar to those skilled in the art. The main concept in route reflection is to use a two-level hierarchy. The set of I-BGP speakers in an AS is partitioned into a collection of disjoint sets referred to as clusters. Each cluster consists of one or more special routers referred to as route reflectors. All other routers in a cluster are referred to as clients of the route reflectors in the cluster. (Note that a cluster may consist only of route reflectors and no clients. In the extreme case, a cluster may have only one member, a route reflector—such a case is a full mesh I-BGP architecture.) The route reflectors in an AS maintain a full mesh of I-BGP connections among themselves, however. These reflectors form the top level in the hierarchy. Furthermore, the clients in a cluster maintain I-BGP sessions with each route reflector in the cluster. These clients form the bottom level in the hierarchy. Typically, there are no I-BGP sessions between clients in one cluster and routers in a different cluster. In practice, this configuration can significantly reduce the number of I-BGP sessions. Of course, in general, each cluster itself can be partitioned into subclusters and so on creating an arbitrarily deep hierarchy.

When route reflection is used, I-BGP behavior is modified slightly. The client routers continue to behave as before, but the behavior of the route reflectors is modified. In particular, on receiving a new route from either an internal or an external BGP peer, the route reflector selects the best route according to the BGP route selection procedure (described below) in the same manner as before. However, depending on the nature of the particular BGP peer from which it received the best route, the route reflector does the following:

(a) if the peer is an E-BGP peer, the route is forwarded to all I-BGP peers (i.e., all client peers in the same cluster and all non-client peers in any cluster), (b) if the peer is a non-client peer in a different cluster, the route is forwarded to all client peers, or (c) if the peer is a client peer (in its own cluster, by definition), the route is forwarded to all non-client peers in other clusters and to all client peers except the originator.

In accordance with the conventional protocol, and as is well known to those skilled in the art, when an I-BGP speaker receives a route update from a BGP peer, it uses the following procedure to select the best route (regardless of the particular I-BGP architecture being used):

1. The route(s) with the highest "degree of preference" (e.g., the maximum value of the LOCAL-PREF attribute) is chosen.

2. If there are multiple such routes, the route(s) with the minimum length of the AS-PATH attribute is chosen. (As is well known, the AS-PATH attribute contains a list of the individual ASs on the given path.) Note that the BGP specification—RFC 1771, cited above—does not specifically mention use of the AS-PATH length to break ties although other references do and it is, in fact, commonly used. Although it will be assumed herein that the AS-PATH length is used in the BGP protocol, the principles and use of the method and apparatus of the present invention apply equally in either case.

3. If there are multiple such routes, for each neighboring AS, consider all the routes with the minimum value of the Multi-Exit-Discriminator (MED) attribute going through the AS. (As is well known, the MED attribute provides a preferential selection criterion when multiple paths have the same next hop AS. Also, note that if there are multiple neighboring ASs, there could be routes with minimal MED values corresponding to each AS.) If there is exactly one such route, this route is chosen.

4. If there are multiple such routes, and there are one or more routes received via E-BGP (E-BGP routes), the E-BGP route with the minimum cost IGP path to the NEXT-HOP router is chosen. (As is also well known, the NEXT-HOP attribute specifies the next hop router of the path as defined above.) Otherwise, go to rule 6.

5. If there are no E-BGP routes and multiple I-BGP routes, the route with the minimum cost IGP path to the NEXT-HOP router is chosen. (Note that the route selection process as described in some references apply rules 4 and 5 differently. In particular, the route with the minimum cost IGP path to the NEXT-HOP is chosen, irrespective of whether it is an E-BGP route or an I-BGP route as specified in rule 4. But, according to these references, if there are multiple minimum IGP cost routes, E-BGP routes are given preference over I-BGP routes as specified in rule 5. Most physical implementations, however, such as those by router manufacturers Cisco and Juniper, apply rules 4 and 5 in the manner described herein, where external routes are preferred over internal routes, irrespective of the cost of the path to the NEXT-HOP router.)

6. If there are multiple such routes, the route received from the neighbor with the minimum BGP identifier is chosen, so as to "break the tie" in an essentially arbitrary manner.

Note that the BGP specification—RFC 1771, cited above—specifies that the degree of preference for a route is calculated by a BGP speaker on receiving the route. If the route is received via I-BGP, the recipient may or may not use the value of the LOCAL-PREF attribute as the degree of preference. However, if the LOCAL-PREF attribute is not used as the degree of preference, then it is possible to create routing oscillations very easily by assigning a route's degree of preference in a particular manner. (See, e.g., T. G. Griffin and G. T. Wilfong, "An Analysis of BGP Convergence Properties," Proceedings of SIGCOMM '99, Cambridge, Mass., August-September, 1999.) Hence, it is assumed herein that the value of the LOCAL-PREF attribute is always used as the "degree of preference" in I-BGP.

Route Oscillations in I-BGP Networks

First, as a point of observation, it can be determined that the key problem which results in persistent route oscillation when using a route reflection architecture is the use of the Multi-Exit-Discriminator (or MED) attribute for route comparison. As is well known to those of ordinary skill in the art, the MED attribute of a BGP route is a non-negative integer that is used to compare routes that pass through the same neighboring AS—the lower the MED value, the more preferred the route. The MED attribute value is advantageously used in configurations where multiple links connect the same AS pair. In such situations, the MED value of a route is used by the AS receiving traffic to indicate to the sending AS which links are to be preferred when receiving traffic. The BGP protocol specifies that routers in the sending AS respect the MED values assigned to a route by the receiving AS. However, since MED values are not used to compare routes that pass through different neighboring ASs, the use of MED values may periodically hide certain routes from view and thereby create the possibility for route oscillations.

FIG. 1 shows a portion of a packet-based network configuration for which persistent route oscillations can occur. The illustrated configuration consists of two clusters, one with route reflector A (which has two client routers as shown) and another with route reflector B (which has one client router as shown). It is assumed that all routes have the same LOCAL-PREF attribute value, and, as can be seen from the figure, the AS-PATH length to destination d is the same for all routes. In the figure, the MED values for routes over the inter-AS links are shown next to the corresponding links between the ASs, and the IGP link costs are shown next to the corresponding links between the route reflectors and between the route reflectors and their client routers. Route identifiers (i.e., $r_1$, $r_2$ and $r_3$) are also shown next to the corresponding inter-AS links. A route oscillation may, for example, be generated in the network shown in FIG. 1 as follows:

1. Route reflector A selects route $r_2$ (since it has a lower IGP metric), and route reflector B selects route $r_3$.

2. A receives $r_3$ as a best route from B, and then selects $r_1$—this is because $r_3$ is better than $r_2$ (since it has a lower MED value), and $r_1$ is better than $r_3$ (since it has a lower IGP metric).

3. B receives $r_1$ from A and selects $r_1$ over $r_3$ (since it has a lower IGP metric), and thus withdraws $r_3$.

4. A selects $r_2$ over $r_1$ (since it has a lower IGP metric), and thus withdraws $r_1$.

5. B selects $r_3$ over $r_2$ (since it has a lower MED value), and the oscillation cycle begins again.

As pointed out above, the reason that such an oscillation can occur is essentially the following. Since MED value comparisons only take place between routes that pass through the same neighboring AS, the presence or absence of a route may change the relative ranking of a different route and thereby cause persistent oscillations. It has been suggested that it is a combination of route reflection and the way in which MED values are compared that is the reason that persistent route oscillations may occur, and therefore, one solution is to only permit full mesh I-BGP architectures. However, as pointed out above, fully-meshed I-BGP architectures encounter scaling problems, and both solutions to the scaling problem (route reflector architectures and confederation architectures) can exhibit routing oscillations of this nature. Moreover, depending on the order in which the selection rules are applied (see discussion above), it is also possible to create persistent oscillations in fully-meshed I-BGP architectures as well.

Figure 2:
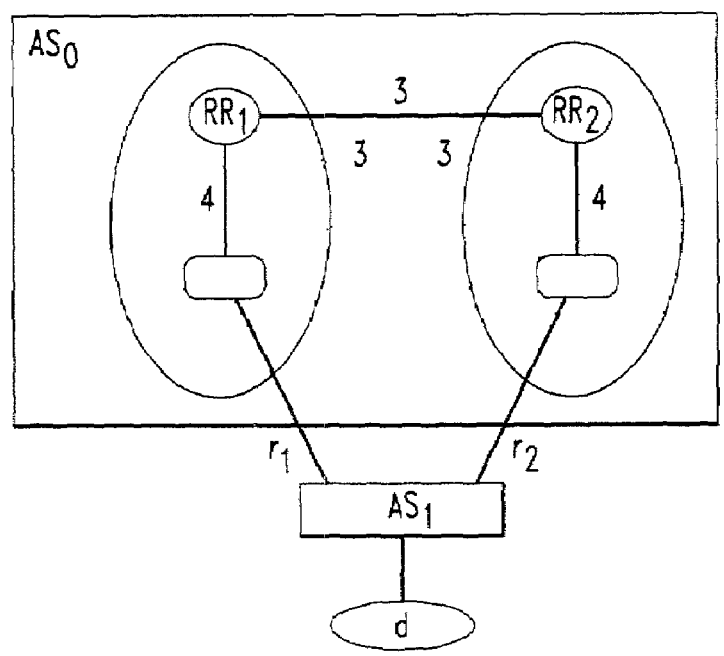
FIG. 2 shows a portion of a packet-based network configuration for which transient route oscillations can occur.

FIG. 2 shows a portion of a packet-based network configuration for which transient route oscillations can occur. The dotted lines in the figure represent additional IGP links between nodes in $AS_0$ over which no I-BGP sessions run (i.e., links between route reflectors and client routers of a different route reflector). It is assumed that all routes have the same LOCAL-PREF attribute value, AS-PATH length (as can be seen from the figure), and MED value 0 (as is shown in the figure next to the inter-AS links). A transient route oscillation may, for example, be generated in the network of FIG. 2 as follows:

1. Route reflector $RR_1$ chooses $r_1$ and route reflector $RR_2$ chooses $r_2$.

2. The two route reflectors advertise their best paths to each other. Now $RR_1$ chooses $r_2$ (since it has a lower IGP cost to NEXT-HOP), and $RR_2$ chooses $r_1$ (since it has a lower IGP cost to NEXT-HOP).

3. Route reflector $RR_1$ withdraws $r_1$ as its best path, and route reflector $RR_2$ withdraws $r_2$ as its best path.

4. Once again, route reflector $RR_1$ chooses $r_1$ and route reflector $RR_2$ chooses $r_2$. Thus, the oscillation cycle repeats.

Note that in this case, two stable routing configurations do in fact exist. In the first such configuration, both route reflectors ($RR_1$ and $RR_2$) choose $r_1$, and in the second such configuration, both $RR_1$ and $RR_2$ choose $r_2$. It can easily be seen that both of these configurations are stable. Moreover, it is possible to reach either of these stable configurations if the route reflectors $RR_1$ and $RR_2$ send and receive messages in a certain order. For example, the first stable configuration will be reached if the following steps occur in order:

1. Route reflector $RR_1$ chooses $r_1$ and advertises it to route reflector $RR_2$.

2. Route reflector $RR_2$ receives $r_1$ (from $RR_1$) and $r_2$ (from its client router), and then chooses $r_1$ (since it has a lower IGP cost to NEXT-HOP). Since it received $r_1$ from route reflector $RR_1$, it does not need to advertise $r_1$ back to $RR_1$. Thus, the system has achieved a stable configuration.

Figure 3:
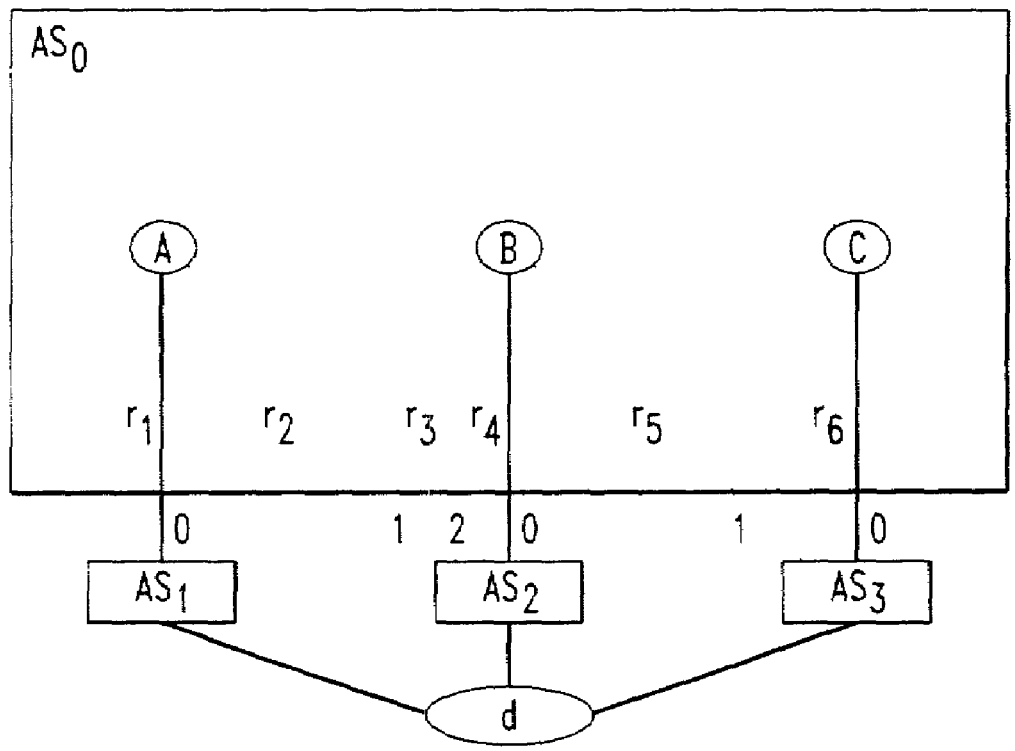
FIG. 3 shows a portion of another packet-based network configuration for which transient route oscillations can occur as a result of messaging delays.

Note that the crucial difference in the two executions (one unstable, the other stable) described above in connection with the network of FIG. 2 is the order in which the route reflectors send and receive messages. In other words, this is an example of a transient route oscillation caused by the particular ordering of messages. FIG. 3 shows a portion of another packet-based network configuration for which transient route oscillations can occur as a result of messaging delays. In particular, the AS shown in FIG. 3 is assumed to have a full mesh architecture—that is, the system is configured such that the I-BGP peering sessions correspond to the IGP links—even though these IGP links are not explicitly shown.

In the example network of FIG. 3, transient route oscillations may be caused by message delays. Routers A, B, and C are I-BGP speakers in Autonomous System $AS_0$ and are connected to (routers in) $AS_1$, $AS_2$, and $AS_3$, as shown in the figure. (As pointed out above, it is assumed that each of the routers A, B, and C are also interconnected to each other via IGP links, but these links are not shown in the figure.) The MED value for each inter-AS link is shown next to the link. (The link cost for each of these links is assumed to be 0.) Each inter-AS link represents an external route to destination d—these routes are labeled $r_1$ through $r_6$, respectively. It is assumed that all these routes have the same LOCAL-PREF attribute value, and, as can be seen from the figure, these routes all have the same AS-PATH length. It is also assumed that the routes represented by dotted lines have lower BGP identifiers than those represented by solid lines.

It can be easily determined that this example has two stable solutions. However, given timing (i.e., messaging) delays, a transient route oscillation can be produced by a sequence of updates as shown in the following table. (Note that in common practice, whenever a router selects a new route it withdraws any previously advertised routes.)

| Router updated | Routes learned via E-BGP | Routes learned via A | Routes learned via B | Routes learned via C | Routes removed via rule 3 | Routes removed via rule 4 | Routes removed via rule 6 | Best route |
|---|---|---|---|---|---|---|---|---|
| C | $r_3, r_6$ | | | | | | $r_6$ | $r_3$ |
| B | $r_4, r_5$ | | | | | | $r_4$ | $r_5$ |
| A | $r_1, r_2$ | | | | | | $r_1$ | $r_2$ |
| C | $r_3, r_6$ | $r_2$ | $r_5$ | | $r_3, r_5$ | $r_2$ | | $r_6$ |
| B | $r_4, r_5$ | $r_2$ | | $r_6$ | $r_2, r_5$ | $r_6$ | | $r_4$ |
| A | $r_1, r_2$ | | $r_4$ | $r_6$ | $r_2$ | $r_4, r_6$ | | $r_1$ |
| C | $r_3, r_6$ | $r_1$ | $r_5$* | | $r_5$ | $r_1$ | $r_6$ | $r_3$ |
| B | $r_4, r_5$ | $r_1$ | | $r_3$ | $r_3$ | $r_1$ | $r_4$ | $r_5$ |
| A | $r_1, r_2$ | | $r_5$ | $r_3$ | $r_3$ | $r_5$ | $r_1$ | $r_2$ |

(* indicates that the timing delay results in stale information.)

Note that even if router A and autonomous system $AS_1$ (together with their associated links) were to be removed from the network shown in FIG. 3, transient route oscillations could still occur, depending upon the timing of when the routes through $AS_2$ and $AS_3$ are injected into $AS_0$.

A Mathematical Formalization of I-BGP with Route Reflection

The concepts discussed above may be mathematically formalized in a graph-theoretic model of the behavior of I-BGP speakers (i.e., routers which participate in the I-BGP protocol) within a given autonomous system (referred to herein as $AS_0$), that uses a route reflection architecture. It is to be assumed herein that only routes for a single particular external destination (prefix), namely, d, will be considered. Note also that since fully-meshed I-BGP can be thought of as a special case of I-BGP with route reflection where each router is a route reflector without any clients, the model presented herein is also a model of fully-meshed I-BGP.

First, it should be noted that the Safe Path Vector Protocol (SPVP) models (see, e.g., U.S. patent application Ser. No. 09/583,595) can not effectively be used to model the I-BGP protocol when MED values are used. This is because the SPVP models rely on each router having a fixed order of preference for routes, but the use of MED values can cause the relative ordering of routes to vary depending on what other routes are being considered.

First, define a connected graph $G_P=(V,E_P)$ called the "physical graph" that captures the physical connectivity of the autonomous system. Each node in V represents a router (i.e., an I-BGP speaker) in $AS_0$. The notation $\Delta_v$ will be used to denote the router represented by the node v. There is an edge uv, $E_P$ if and only if $\Delta_u$ and $\Delta_v$ have a physical link connecting them in $AS_0$. Each edge uv, $E_P$ has a positive integer cost, cost(uv), representing the IGP cost metric for uv. Then, define cost(p) of a path p in $G_P$ to be the sum of the costs of the edges in p. The "shortest path", SP(u,v), between two nodes in V, is chosen (deterministically) from one of the least cost paths in $G_P$ between u and v. Finally, let $AS_1, AS_2, \ldots, AS_m$ be the autonomous systems which have routers that maintain E-BGP peering sessions with routers in $AS_0$.

Figure 4:
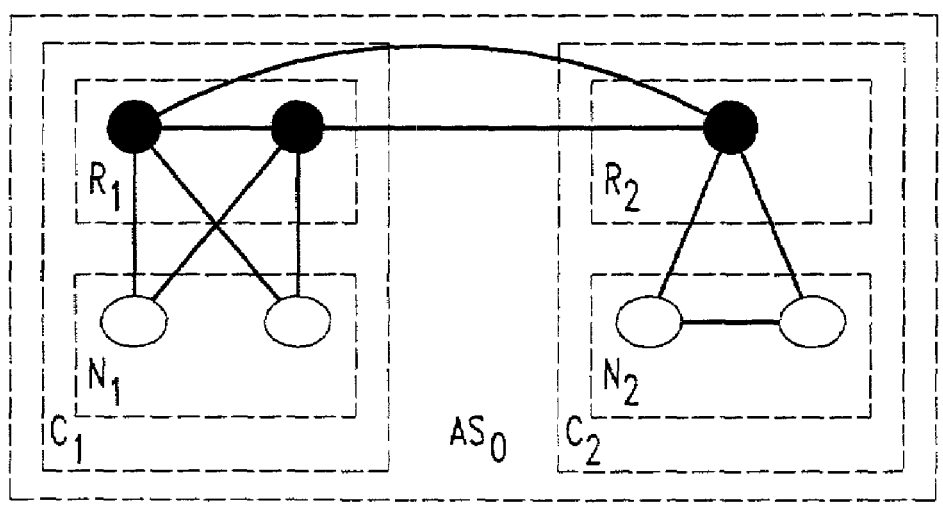
FIG. 4 shows a portion of an autonomous system (AS) within a packet-based network, wherein the AS uses a route reflector I-BGP architecture.

Next, define a second graph $G_1=(V,E_I)$ called the "logical graph" that represents I-BGP peering relationships. Here, there is an edge uv, $E_I$ if the routers $\Delta_u$ and $\Delta_v$ are I-BGP peers. To model route reflection, define a partition of the nodes in V into sets $C_1, C_2, \ldots, C_k$, where each partition $C_i$ represents a router cluster in $AS_0$. Let $R_i \subseteq C_i$ be the set of nodes representing the route reflectors in the cluster $C_i$. Let $N_i$ be the set of nodes in $C_i$ but not in $R_i$. A node in $R_i$ is called a "reflector node" and a node in $N_i$ is called a "client node". Let $R=\cup_{i=1}^{k} R_i$ and $N=\cup_{i=1}^{k} N_i$ as illustratively shown in FIG. 4, which shows a portion of an autonomous system (AS) within a portion of an autonomous system (AS) within a packet-based network, wherein the AS uses a route reflector I-BGP architecture. A client node in cluster $C_i$ is referred to as a client of all the nodes in $R_i$. Note that the edges in $E_I$ satisfy certain constraints imposed by the conditions:

1. there is an edge uv, $E_I$ for every pair of nodes u, v in R,
2. there is an edge from every node in $N_i$ to every node in $R_i$, $1 \leq i \leq k$,
3. there are no edges from any node in $N_i$ to any node in $C_j$ where $i \neq j$ and
4. there may be edges between arbitrary pairs of nodes u and v if u,v, $N_i$ for some i.

In practice, it is often the case that each router cluster has exactly one route reflector and client nodes in the same cluster do not maintain I-BGP adjacencies. However, multiple reflectors per cluster are allowed, as well as I-BGP peering sessions among clients in the same cluster, thereby making the model defined herein more general. (Note that the specification of the BGP route reflection architecture does not explicitly disallow such configurations.)

An "exit path" p represents a BGP route $b_p$ to destination d in an E-BGP message injected into $AS_0$. An exit path p has the following attributes:

1. localPref(p) is a non-negative integer that represents the local preference assigned to $b_p$ when it is injected into I-BGP running on $AS_0$.
2. AS-Path(p) is a list of autonomous systems $AS_0$, $AS_{i_1}, \ldots, AS_{i_s}$, and represents the AS-PATH attribute of the BGP route $b_p$.
3. AS-path-length(p) is a positive integer representing the length of the AS-PATH attribute of $b_p$.
4. nextAS(p) is the autonomous system from which $AS_0$ received the BGP route $b_p$ via E-BGP. Thus if AS-Path(p)= $AS_0, AS_{i_1}, \ldots, AS_{i_s}$, then nextAS(p)=$AS_{i_1}$.
5. MED(p) is a non-negative integer that represents the Multi-Exit-Discriminator (MED) assigned to $b_p$.
6. nextHop(p) is an IP-address representing the usual NEXT-HOP attribute associated with an E-BGP route. (In practice, the NEXT-HOP is typically a BGP speaker in a neighboring autonomous system. This implies that the IGP running in $AS_0$ must know how to get to the NEXT-HOP address, even though it is outside the AS.)
7. exitPoint(p) is the node in V that represents the router in $AS_0$ which learned of $b_p$ via E-BGP. Then, it can be said that p is an "exit path" from v=exitPoint(p). Note that exitPoint(p) is uniquely defined since there is a one-to-one correspondence between the NEXT-HOP attribute for $b_p$ and exitPoint(p). (In actual networks, the NEXT-HOP refers to the IP address of the remote end of a numbered link—in other words, a port on the neighboring router. Hence, a one-to-one correspondence exists. However, for simplicity, ports are not explicitly modeled herein, since not doing so does not affect the analysis or understanding of the present invention.)

8. exitCost(p) is some non-negative integer value representing the cost associated with the link from exitPoint(p) to nextHop(p).

Figure 5:
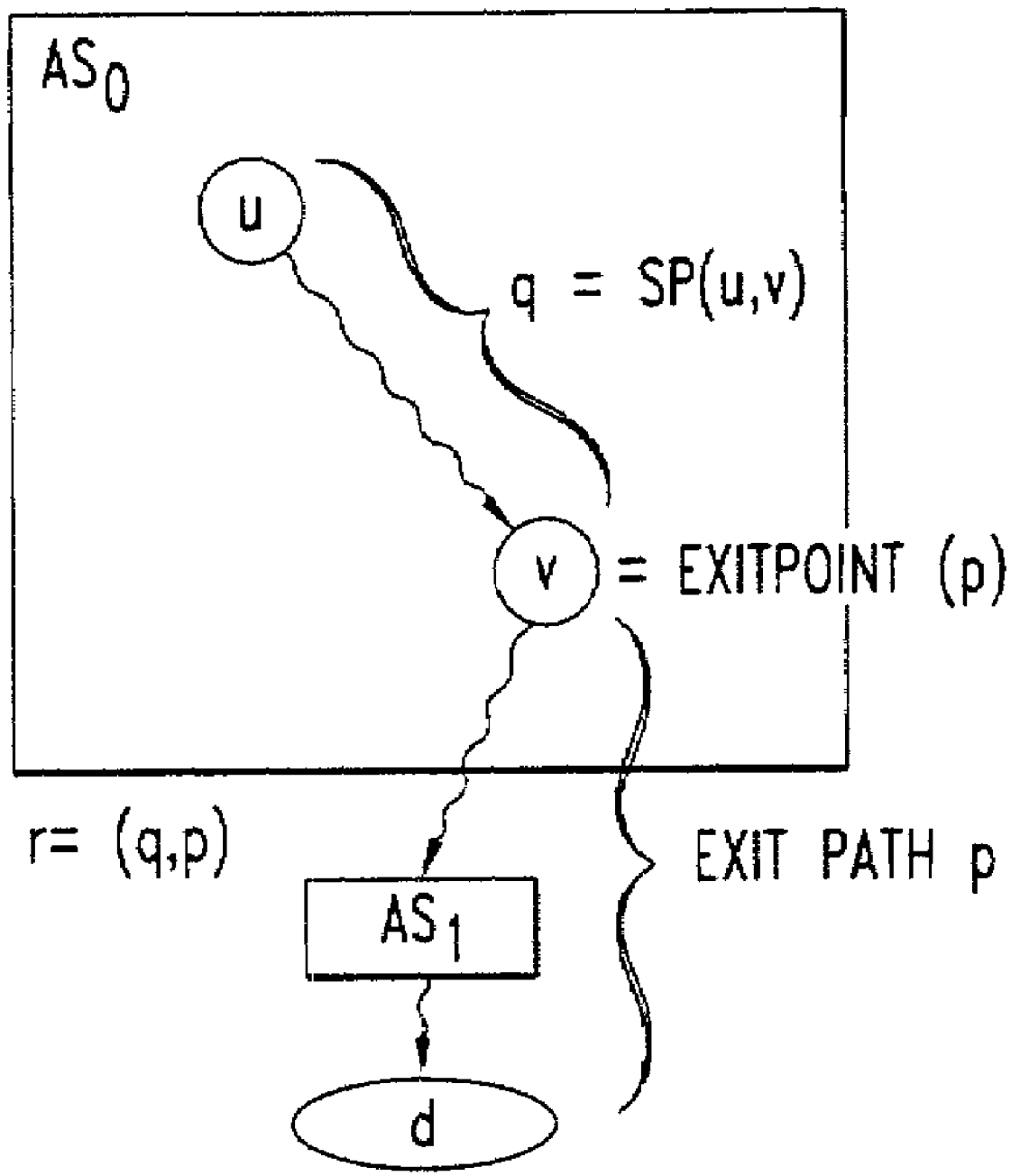
FIG. 5 shows a portion of a packet-based network illustrating an exit path and route from a router in an AS to a destination.

A route r from a node u, V is an ordered pair (q,p), where p is an exit path and q is a path in $G_P$ which joins u to the node v=exitPoint(p). FIG. 5 shows a portion of a packet-based network illustrating such an exit path (p) and route (q,p) from a router (u) in an AS ($AS_0$) to a destination (d). Note that the path q coincides with the selected "shortest" path SP(u,v)—that is, the path with the minimum IGP cost metric. Then, q and p may be referred to as the "internal" and "external" parts of r, respectively. In addition, exit(r) denotes the external part p of the route r. Such a route inherits all the attributes from its external part—e.g., a reference to MED(r) refers simply to MED(p). In addition, let metric(r) denote the length of the (shortest) path q plus exitCost(p). If u=v, then r corresponds to an E-BGP route (as opposed to an I-BGP route), and is essentially equivalent to the exit path p. Note that in such cases, metric(r) is simply exitCost(p), since the internal part is the trivial single node path, which has cost 0. The other attribute associated with a route r is the attribute learnedFrom(r), which denotes the BGP identifier of the (BGP) peer from which u received the route r. Note that in the case of E-BGP, learnedFrom(r) is the same as the BGP identifier for nextHop(r). In the case of I-BGP, learnedFrom(r) denotes the BGP identifier for the I-BGP neighbor that advertised r to u.

Note that a route is uniquely determined by an exit path p and a node u. Thus, let route(p,u) denote the route (SP(u,v), p) where v=exitPoint(p). For a set of exit paths P, define route(P,u)={route(p,u)|p, P}; and similarly, for a set of routes S, define exit(S)={exit(s)|s, S}.

The following provides a formalized operational description of an I-BGP router. Consider a discrete model of time t=1, 2, .... For an arbitrary set S of routes from a given node v, V, define $best_v(S)=Choose\_best(v,S)$, where the procedure Choose_best(v,S) is defined as follows:

```
proc Choose_best(v,S) {
    maxPref := max localPref(r)
               r∈S

S := {r : r, S and localPref(r) = maxPref}
    if (|S| = 1) return(b, S)

minASPL := min AS-path-length(r)
               r∈S

S := {r : r, S and AS-path-length(r) = minASPL}
    if (|S| = 1) return(b, S)
    for (j = 1,2, ... m) {
        S_j := {r : r , S and nextAS(r) = j} minMed_j := min MED(r)
                   r∈S

S_j := {r : r, S_j and MED(r) = minMed_j}
    }
```

$$S := \bigcup_j S_j$$

if (|S| = 1) return(b, S)

if (∃ r, S : exitPoint(r) = v)

then S := {r : r, S and exitPoint(r) = v}
if (|S| = 1) return(b , S)

minMetric := min metric(r)
               r∈S

S := {r : r, S and metric(r) = minMetric}
if (|S| = 1) return(b, S)

b := min learnedFrom(r)
     r∈S return(b)
}

A "configuration" at time t, config(t), consists of the following for each v, V:

1. MyExits(v), a set of exit paths from v (i.e., exitPoint(p)=v for p, MyExits(v)) that does not vary with time.
2. PossibleExits(v,t), a set of exit paths,
3. BestExits(v,t), a set of exit paths, and
4. BestRoute(v,t), a route from v.

These objects satisfy the following conditions:
1. PossibleExits(v,t) ⊇ MyExits(v),
2. BestRoute(v,t)=$best_v$(route(PossibleExits(v,t),v)), and
3. BestExits(v,t)={exit(BestRoute(v,t))}.

Intuitively, MyExits(v) represents the E-BGP routes that the router $\Delta_v$ currently knows about. The set PossibleExits(v,t) represents the exit paths (learned by router $\Delta_v$ either via E-BGP or via I-BGP) that router $\Delta_v$ could choose from at time t. The set BestRoute(v,t) corresponds to the best route chosen by router $\Delta_v$ at time t. And finally, the set BestExits(v,t) represents the exit path corresponding to $\Delta_v$'s choice of best route to d. Depending on certain conditions as described below, $\Delta_v$ advertises this path to some of its I-BGP peers.

The configuration config(t) is "valid" at time t, if for each v, V and p, PossibleExits(v,t), then p, MyExits(exitPoint(p)). That is, in a valid configuration, all exit paths that are in the system are ones that are currently known by their exit points (i.e., they have not been subsequently withdrawn after they were injected into $AS_0$).

The following provides a formalized model of how routers communicate in I-BGP. For a set of exit paths P and distinct nodes u,v, V, define the subset $Transfer_{v \to u}(P) \subseteq P$ such that p is in $Transfer_{v \to u}(P)$ if and only if p, P, vu is an edge in $E_I$ and
1. exitPoint(p)=v, or
2. v, $R_i$, u, $R_j$, for some i≠j, and exitPoint(p)=w for some node w, $N_i$, or
3. v, $R_i$, u, $N_i$ for some i and exitPoint(p)≠u.

The subset $Transfer_{v \to u}(P)$ models communication between routers $\Delta_v$ and $\Delta_u$. Suppose p, P is the path associated with BGP route $b_p$. Then $Transfer_{v \to u}(P)$ models the fact that $\Delta_v$ announces $b_p$ to I-BGP peer $\Delta_u$ if one of three conditions hold. The first condition is that $\Delta_v$ has learned $b_p$ from an E-BGP neighbor. The second condition is that $\Delta_u$ and $\Delta_v$ are route reflectors in different clusters and that $b_p$ is an exit path from a client of $\Delta_v$. And the third condition is that $\Delta_u$ is a client of $\Delta_v$ and that $b_p$ is not an exit path from $\Delta_u$ (thereby preventing loops in routing announcements). Note that neighbor-specific incoming and outgoing filters for BGP routes are not modeled here, since such filters are only applied for E-BGP peers and not for I-BGP peers.

A "fair activation sequence" $\Phi$ of node set V is a sequence $\Phi_1, \Phi_2, \ldots$, of non-empty subsets of V referred to as "activation sets", such that every node u, V occurs in infinitely many $\Phi_t$s. Intuitively, an activation sequence represents an ordering of when the individual routers transfer messages and update their best routes to d. A fair sequence indicates that there are no router crashes.

Suppose config($t_0$) is a configuration at time $t_0$. Then, for any $t > t_0$, if $u \notin \Phi_t$, then PossibleExits(u,t)=PossibleExits(u,t−1), BestRoute(u,t)=BestRoute(u,t−1), and BestExits(u,t)=BestExits(u t−1). However, if u, $\Phi_t$, then define:

$$PossibleExits(u, t) = \bigcup_{v \in V} Transfer_{v \to u}(BestExits(v, t-1)) \cup MyExits(u)$$

$$BestRoute(u, t) = best_u(route(PossibleExits(u, t), u))$$

$$BestExits(u, t) = \{exit(BestRoute(u, t))\}$$

In other words, whenever a router takes a step, it receives advertisements from each of its neighbors about their best routes. It then updates its own best route based on the new information. Finally, it advertises the exit path corresponding to its best route to its I-BGP peers. (Note that message delays in transit are not explicitly modeled here.)

An I-BGP Method According to One Illustrative Embodiment of the Invention

In accordance with the principles of the present invention, the graph-theoretic model of the I-BGP protocol presented above may be advantageously extended to address the route oscillation problems of the prior art. In particular, it can be determined that with the use of one such extended model, in accordance with one illustrative embodiment of the present invention and as presented herein, convergence can be guaranteed (i.e., no oscillations will ever occur), as opposed to the prior art techniques, for which it can and has been shown otherwise based on the model thereof. (See, for example, the discussion of persistent and transient route oscillations, above.) Such an extended model may then be advantageously employed to provide a novel method and apparatus in accordance with certain illustrative embodiments of the present invention, thereby solving the problems of the prior art.

Specifically, in accordance with one illustrative embodiment of the present invention, define $S^= = Choose\_max^=(S)$ for a set of exit paths S, where the procedure $Choose\_max^=(S)$ is as follows:

```
proc Choose_max⁻(S) {
    maxPref := max localPref(p)
              p∈S

S := {p : p , S and localPref(p) = maxPref} minASPL := min AS-path-length(p)
               p∈S
```

```
    S := {p : p , S and AS-path-length(p) = minASPL}
    for (j = 1,2, . . . m) {
        Sⱼ := {p : p, S and nextAS(p) = j} minMedⱼ := min MED(p)
                   p∈S

Sⱼ := {p : p, Sⱼ and MED(p) = minMedⱼ}
    }

S := ⋃ Sⱼ
        j return(S)
}
```

Now consider a fair activation sequence, $\Phi$ of node set V as defined above. Suppose that config(0) is a valid configuration at time t=0. Then for any t>0, if $u \notin \Phi_t$, then PossibleExits(u,t)=PossibleExits(u,t−1), BestRoute(u,t)=BestRoute(u,t−1), and BestExits(u,t)=BestExits(u,t−1). However, if u, $\Phi_t$, then define:

$$PossibleExits(u, t) = \bigcup_{v \in V} Transfer_{v \to u}(BestExits(v, t-1)) \cup MyExits(u)$$

$$BestRoute(u, t) = best_u(route(PossibleExits(u, t), u))$$

$$BestExits(u, t) = Choose\_max^=(PossibleExits(u, t)).$$

Note that it would be equivalent to define:

BestRoute(u,t)=best$_u$(route(BestExits(u,t),u)).

Intuitively, note that the modifications from the prior art I-BGP model to the I-BGP model in accordance with an illustrative embodiment of the present invention described herein result in the following functionality changes. Each I-BGP router r advertises a set of best exit paths to all its I-BGP peers, rather than just a single best exit path. All of the exit paths in this set advantageously have the highest LOCAL-PREF attribute value and the lowest AS-PATH length value among all of the possible exit paths known to r. Furthermore, if p is an exit path in this set, and if p passes through neighboring autonomous system $AS_k$, then p advantageously has the lowest MED among all exit paths passing through $AS_k$ that are known to r. Obviously, there may be multiple such exit paths corresponding to each $AS_k$, or there may be none, if they do not have the appropriate values of LOCAL-PREF (i.e., equal to the highest) and AS-PATH length (i.e., equal to the lowest).

Figure 6:
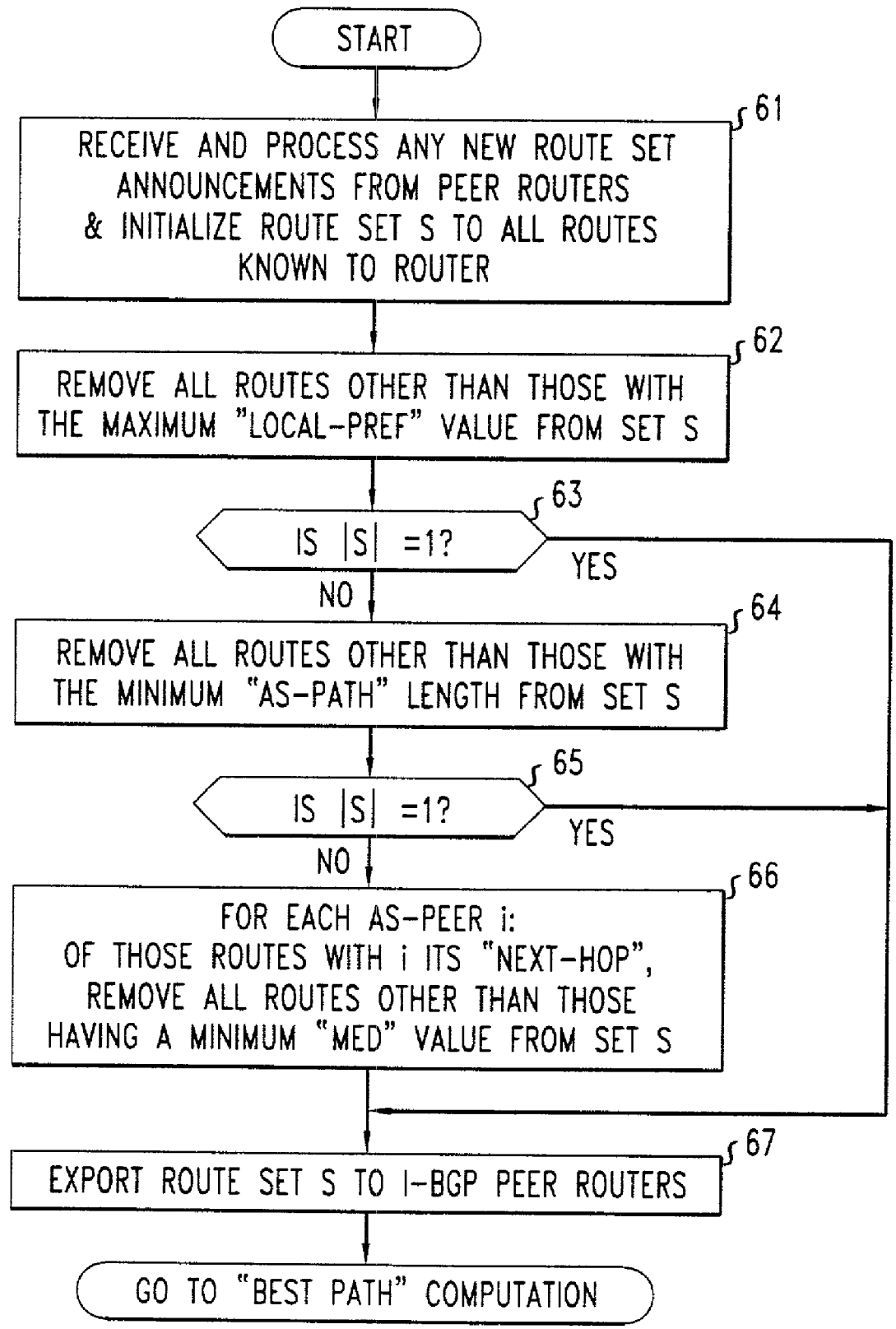
FIG. 6 shows a flowchart for execution by an illustrative I-BGP router which computes a route set to a given destination and exports it to the I-BGP router's peers in accordance with one illustrative embodiment of the present invention.

FIG. 6 shows a flowchart for execution by an illustrative I-BGP router which computes a route set to a given destination, and exports it to the I-BGP router's peers in accordance with one illustrative embodiment of the present invention. Specifically, the illustrative operation proceeds as follows. First, in block 61, the router receives and processes any new route set announcements from its peer routers, and then initializes the route set S to include all routes to the given destination which are known to it. Then, in block 62, it removes from the route set S all routes which do not have the maximum value of the LOCAL-PREF attribute (since in accordance with the BGP protocol, the LOCAL-PREF attribute acts as the highest priority route differentiator). If, as tested by decision 63, this results in a route set containing only a single route, then flow proceeds to block 67 (see below). Otherwise, in block 64, the router removes from the route set S all routes which do not have the minimum AS-PATH length value (since, in accordance with the BGP protocol, the AS-PATH length acts as the next highest priority route differentiator), and if, as tested by decision 65, this results in a route set containing only a single route, then flow again proceeds to block 67 (see below). Otherwise, in block 66, for each neighboring AS (i.e., each AS-PEER), the router considers the subset of route set S containing those routes which have a router in the given AS as their NEXT-HOP, and eliminates all routes which do not have the minimum "MED" attribute value (amongst the routes of that subset), since lower values of the "MED" attribute are, in accordance with the BGP protocol, to be preferred amongst routes between the same two ASs. That is, when there are multiple routes having the same AS-PEER as a NEXT-HOP, only those having the minimum possible MED value amongst them will remain in the route set S. Finally, in block 67, and in accordance with the principles of the present invention, the router exports the resultant route set S to each of its I-BGP peer routers within its AS. Note that the router can now also proceed with its own computation of a best path to the given destination (as shown at the end of the flowchart) in accordance with, for example, the illustrative flowchart shown in FIG. 7 and as described below.

Figure 7:
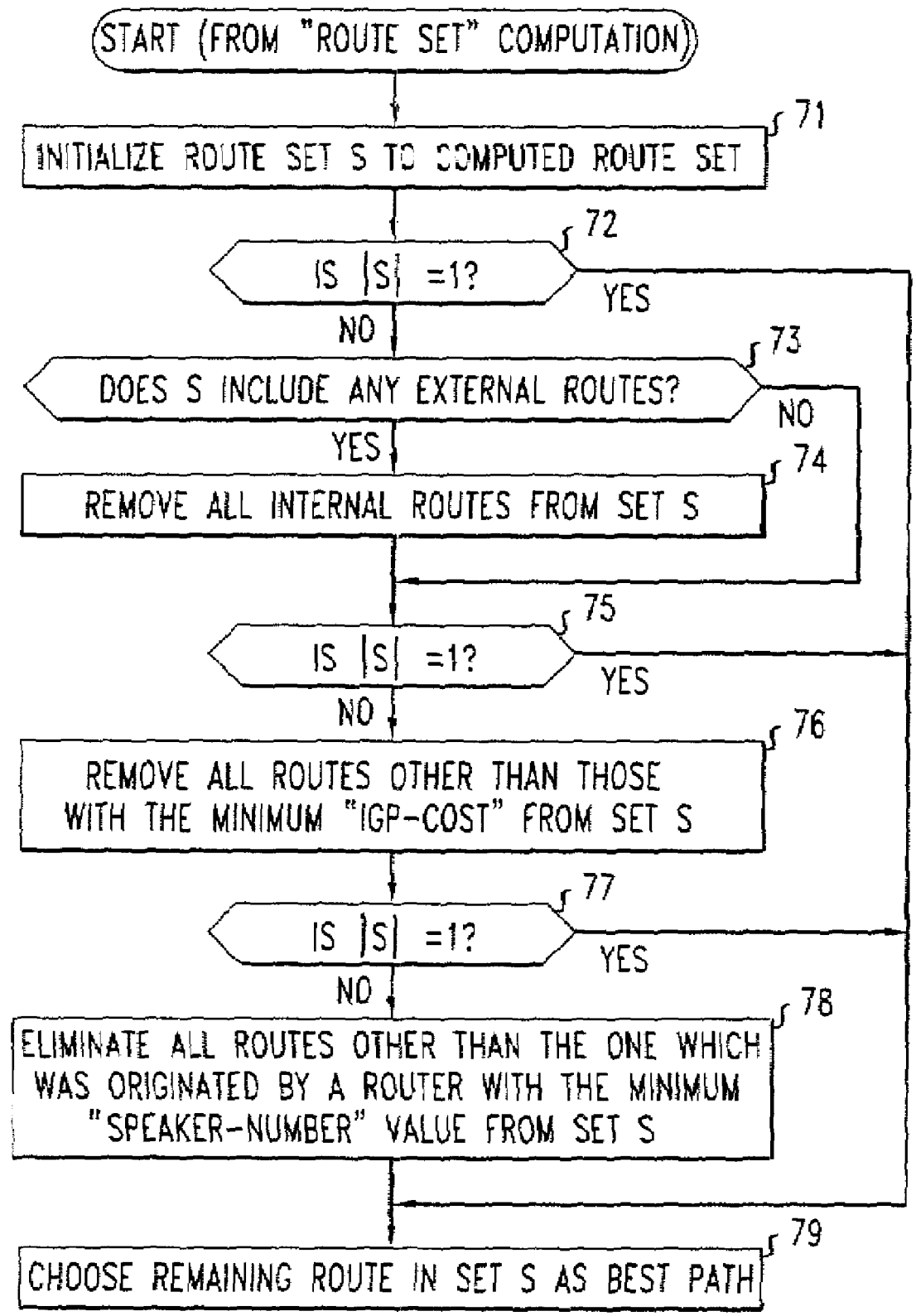
FIG. 7 shows a flowchart for execution by an illustrative I-BGP router which computes a best path to a given destination, based upon the route set illustratively generated in FIG. 6, in accordance with one illustrative embodiment of the present invention.

FIG. 7 shows a flowchart for execution by an illustrative I-BGP router which computes a best path to a given destination, based upon the route set illustratively generated in FIG. 6, in accordance with one illustrative embodiment of the present invention. Specifically, the illustrative operation proceeds as follows. First, in block 71, the route set S is initialized to the route set computed by the illustrative flowchart shown in FIG. 6 and described above. Then, decision 72 determines whether there is only a single route in route set S, and if so, flow proceeds to block 79. Otherwise, decision 73 determines whether the route set S includes any external routes, and if so, block 74 removes all internal routes from route set S (since in accordance with the BGP protocol, external routes are given preference over internal routes). Then, decision 75 again determines whether there is only a single route in route set S, and if so, flow proceeds to block 79. Otherwise, block 76 removes all routes other than those with the minimum value of IGP-COST to the NEXT-HOP router (i.e., the route with the minimum internal routing cost within the AS), and then, decision 77 once again determines whether there is only a single route in route set S, and if so, flow proceeds to block 79. Otherwise, block 78 removes all routes other than the one which was originated by the router having the minimum SPEAKER-NUMBER value, thereby leaving only the one route (originated by the router with the minimum SPEAKER-NUMBER value) in the set. Note that this is an essentially arbitrary rule, provided in accordance with the BGP protocol for purposes of "breaking ties" after all other rules have been applied. Finally, in block 79, the router is able to choose the one and only remaining route in route set S as its best path to the given destination.

Addendum to the Detailed Description

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent (within the meaning of that term as used in 35 U.S.C. 112, paragraph 6) to those explicitly shown and described herein.

We claim:

1. A method for communicating routes in a packet-based network, the method for use at a first router comprised in a first autonomous system, the method comprising the steps of:
receiving a first routing message in conformance with a Border Gateway Protocol from a peer router of said first router, the first routing message comprising a first path from the first autonomous system to a destination, the first path from the first autonomous system to the destination including a second autonomous system, the second autonomous system being a next hop of said first path;
receiving a second routing message in conformance with a Border Gateway Protocol from a peer router of said first router, the second routing message comprising a second path from the first autonomous system to the destination, the second path from the first autonomous system to the destination being different from the first path from the first autonomous system to the destination, the second autonomous system also being a next hop of said second path; and
sending a third routing message to one or more internal peer routers of said first router, said one or more internal peer routers comprised in said first autonomous system, the third routing message comprising at least both the first path from the first autonomous system to the destination and the second path from the first autonomous system to the destination,
wherein the first path and the second path have been selected from a set of paths from the first autonomous system to the destination, each of said paths having said second autonomous system as a next hop thereof, and wherein said first path and said second path have equal and maximum values of a degree-of-preference attribute among the paths in said set of paths from which the first path and the second path have been selected, equal and minimum values of a length of an autonomous-system-path attribute among the paths in said set of paths from which the first path and the second path have been selected, and equal and minimum values of a multi-exit-discriminator attribute among the paths in said set of paths from which the first path and the second path have been selected.

2. The method of claim 1 wherein the packet-based network comprises the Internet.

3. The method of claim 1 wherein said first router and said one or more internal peer routers comprised in the first autonomous system are comprised in a set of routers which communicate routes with use of a route reflection architecture.

4. The method of claim 1 wherein said first router and said one or more internal peer routers comprised in the first autonomous system are comprised in a set of routers which communicate routes with use of a full mesh architecture.

5. The method of claim 1 further comprising the step of selecting a best path from said first router to said destination, said best path being selected from a set of paths from said first autonomous system to said destination which includes said first path and said second path and which are comprised in said third routing message.

6. The method of claim 5 wherein said step of selecting the best path comprises:
initializing a set of possible best paths to said set of paths from said first autonomous system to said destination which includes said first path and said second path and which are comprised in said third routing message;
eliminating from the set of possible best paths any paths which include a route internal to said first autonomous system if there are any paths which do not include a route internal to said first autonomous system in said set of possible best paths;
removing from the set of possible best paths any paths that do not have a minimum value of an Internal Gateway Protocol cost among the set of possible best paths; and
selecting, as the best path, a path that remains in said set of possible best paths after said eliminating step and said removing step.

7. The method of claim 6 wherein said step of selecting, as the best path, a path that remains in said set of possible best paths, comprises selecting a path based on a speaker-number value of a router from which said path was originated.

8. A first router comprised in a first autonomous system, the first router operable to communicate routes in a packet-based network, the first router comprising:
means for receiving a first routing message in conformance with a Border Gateway Protocol from a peer router of said first router, the first routing message comprising a first path from the first autonomous system to a destination, the first path from the first autonomous system to the destination including a second autonomous system, the second autonomous system being a next hop of said first path;
means for receiving a second routing message in conformance with a Border Gateway Protocol from a peer router of said first router, the second routing message comprising a second path from the first autonomous system to the destination, the second path from the first autonomous system to the destination being different from the first path from the first autonomous system to the destination, the second autonomous system also being a next hop of said second path; and
means for sending a third routing message to one or more internal peer routers of said first router, said one or more internal peer routers comprised in said first autonomous system, the third routing message comprising at least both the first path from the first autonomous system to the destination and the second path from the first autonomous system to the destination,
wherein the first path and the second path have been selected from a set of paths from the first autonomous system to the destination, each of said paths having said second autonomous system as a next hop thereof, and wherein said first path and said second path have equal and maximum values of a degree-of-preference attribute among the paths in said set of paths from which the first path and the second path have been selected, equal and minimum values of a length of an autonomous-system-path attribute among the paths in said set of paths from which the first path and the second path have been selected, and equal and minimum values of a multi-exit-discriminator attribute among the paths in said set of paths from which the first path and the second path have been selected.

9. The first router of claim 8 wherein the packet-based network comprises the Internet.

10. The first router of claim 8 wherein said first router and said one or more internal peer routers comprised in the first autonomous system are comprised in a set of routers which communicate routes with use of a route reflection architecture.

11. The first router of claim 8 wherein said first router and said one or more internal peer routers comprised in the first autonomous system are comprised in a set of routers which communicate routes with use of a full mesh architecture.

12. The first router of claim 8 further comprising means for selecting a best path from said first router to said destination, said best path being selected from a set of paths from said first autonomous system to said destination which includes said first path and said second path and which are comprised in said third-routing message.

13. The first router of claim 12 wherein said means for selecting the best path comprises:

means for initializing a set of possible best paths to said set of paths from said first autonomous system to said destination which includes said first path and said second path and which are comprised in said third routing message;

means for eliminating from the set of possible best paths any paths which include a route internal to said first autonomous system if there are any paths which do not include a route internal to said first autonomous system in said set of possible best paths;

means for removing from the set of possible best paths any paths that do not have a minimum value of an Internal Gateway Protocol cost among the set of possible best paths; and means for selecting, as the best path, a path that remains in said set of possible best paths after said eliminating step and said removing step.

14. The first router of claim 13 wherein said means for selecting, as the best path, a path that remains in said set of possible best paths, comprises means for selecting a path based on a speaker-number value of a router from which said path was originated.

* * * * *